United States Patent
Beumler et al.

(10) Patent No.: US 12,497,152 B2
(45) Date of Patent: Dec. 16, 2025

(54) AIRCRAFT STRUCTURE PART AND METHOD FOR PROVIDING AN AIRCRAFT STRUCTURE PART

(71) Applicant: Airbus Operations GmbH, Hamburg (DE)

(72) Inventors: Thomas Beumler, Jork (DE); Andreas Poppe, Reeßum (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/050,203

(22) Filed: Feb. 11, 2025

(65) Prior Publication Data

US 2025/0256829 A1    Aug. 14, 2025

(30) Foreign Application Priority Data

Feb. 13, 2024    (EP) .................................... 24157350

(51) Int. Cl.
*B64C 1/00*       (2006.01)
*B32B 3/08*       (2006.01)
(Continued)

(52) U.S. Cl.
CPC .................. *B64C 1/00* (2013.01); *B32B 3/08* (2013.01); *B32B 5/02* (2013.01); *B32B 7/08* (2013.01); *B32B 15/043* (2013.01); *B32B 15/14* (2013.01); *B32B 15/20* (2013.01); *B32B 37/18* (2013.01); *B32B 2250/44* (2013.01);
(Continued)

(58) Field of Classification Search
CPC .. B32B 3/08; B32B 3/18; B32B 3/263; B64C 2001/0072
See application file for complete search history.

(56) References Cited

U.S. PATENT DOCUMENTS

| 6,736,919 B1 * | 5/2004 | Roebroeks | B32B 27/00 156/196 |
| 7,531,058 B2 * | 5/2009 | Grose | B29D 99/0021 156/304.3 |

(Continued)

FOREIGN PATENT DOCUMENTS

WO    9853989 A1    12/1998

OTHER PUBLICATIONS

European Search Report for EP Application No. 24157350.0, dated Jul. 23, 2024, 5 pages.

*Primary Examiner* — Brian M O'Hara
(74) *Attorney, Agent, or Firm* — KDW Firm PLLC

(57) ABSTRACT

An aircraft structure part having a stacked arrangement of layers with the layers being one of an at least first doubler and a basic layer of the outer skin of an aircraft fuselage, with the first doubler and the basic layer being bonded by a first intermediate bond film layer to form a step-shaped configuration of the aircraft structure part, wherein the first doubler includes a first fiber prepreg layer, in particular glass fiber prepreg layer, arranged at the perimeter of the first doubler and wherein the first fiber prepreg layer is bonded to the basic layer by at least one first bond-film segment deposited adjacent to the first fiber prepreg layer in a first wedge-shaped element at least partially incorporating the first fiber prepreg layer. A method is disclosed for providing an aircraft structure part and an aircraft fuselage provided with the aircraft structure part.

15 Claims, 2 Drawing Sheets

(51) Int. Cl.
  *B32B 5/02* (2006.01)
  *B32B 7/08* (2019.01)
  *B32B 15/04* (2006.01)
  *B32B 15/14* (2006.01)
  *B32B 15/20* (2006.01)
  *B32B 37/18* (2006.01)
  *B62B 3/08* (2006.01)

(52) U.S. Cl.
  CPC ... *B32B 2260/021* (2013.01); *B32B 2262/101* (2013.01); *B32B 2305/22* (2013.01); *B32B 2311/24* (2013.01); *B32B 2315/085* (2013.01); *B32B 2605/18* (2013.01); *B64C 2001/0072* (2013.01)

(56) References Cited

U.S. PATENT DOCUMENTS

| | | | |
|---|---|---|---|
| 7,875,333 B2 * | 1/2011 | Stephan | B29C 70/86 428/189 |
| 9,359,060 B2 * | 6/2016 | Kajita | B32B 3/266 |
| 9,731,807 B2 * | 8/2017 | Beumler | B32B 15/20 |
| 2008/0292849 A1 | 11/2008 | Stephan | |
| 2013/0316148 A1 | 11/2013 | Gunnink | |

* cited by examiner

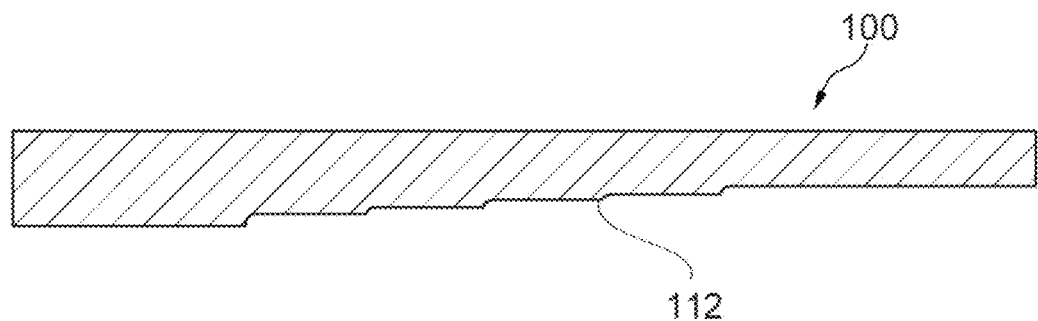
Fig. 1 - Prior Art
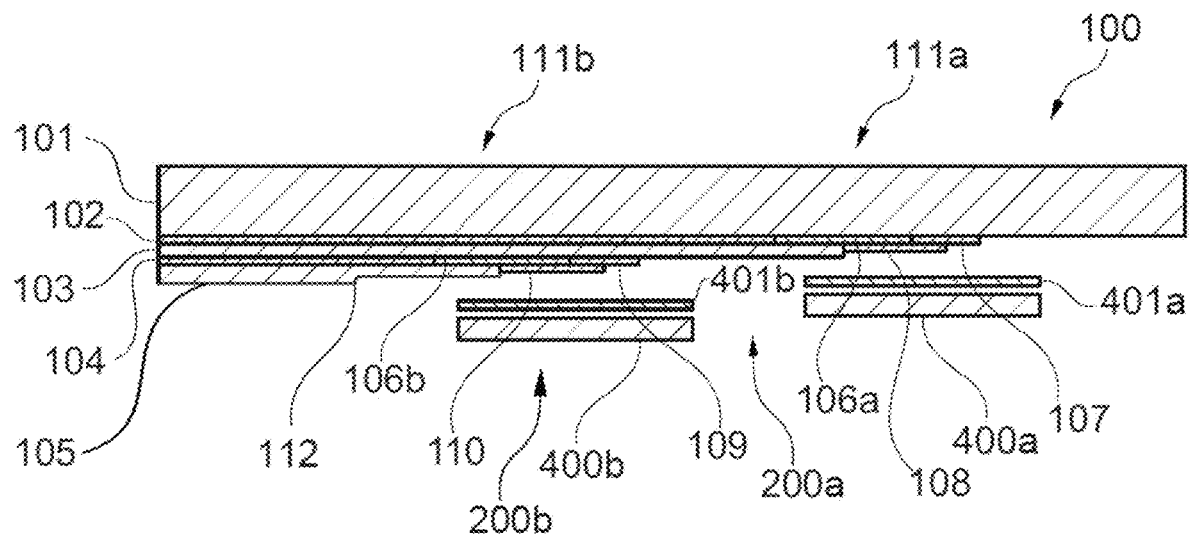
Fig. 2

AIRCRAFT STRUCTURE PART AND METHOD FOR PROVIDING AN AIRCRAFT STRUCTURE PART

TECHNICAL FIELD

The disclosure herein relates to an aircraft structure part and a method for providing such an aircraft structure part.

BACKGROUND

Aircraft, and in particular aircraft fuselages, have distinct areas that are subject to particular demands as to load carrying and load transfer. These areas or the structure parts are often located in areas of the aircraft that are difficult to access. The aircraft structure parts must have a design that prevents cracks from occurring or allow for crack propagation in a controlled manner. Steps along longitudinal skin joints are generally avoided and rare as they are complex to design tolerance-wise and need extra care in fatigue calculation and testing for certification. Parts involved in these joints usually have to be stepped down in many small steps to fulfil aerodynamic and optical requirements with respect to steps in outside surfaces of aircraft fuselages.

Although it can be used in many applications, the disclosure herein and the problems underlying it are explained in greater detail in relation to aircrafts. However, the structure parts described can likewise be used in vehicles in all sectors of the transport industry, e. g. for road vehicles, for rail vehicles or for watercraft.

SUMMARY

Against this background, it is an object of the disclosure herein to provide an aircraft structure part, that fulfills aerodynamic and optical requirements, provides load carrying capacities, is not or only in a minor extend susceptible to crack formation and crack propagation and can be manufactured in an efficient and cost as well as material saving manner.

This object is achieved by a aircraft structure part, a method, and an aircraft fuselage as disclosed herein.

According to a first aspect of the disclosure herein an aircraft structure part comprising a stacked arrangement of layers with the layers forming an outer skin of an aircraft fuselage is provided. The layers comprise at least a first doubler and a basic layer, wherein the first doubler is bonded to the basic layer by a first intermediate bond film layer thus creating a step-shaped configuration of the aircraft structure part. The first doubler includes a first fiber prepreg layer, particularly a glass fiber prepreg layer, positioned at the perimeter of the first doubler and bonded to the basic layer by at least one first bond-film segment deposited adjacent to the first fiber prepreg layer in a first wedge-shaped element. The wedge-shaped element at least partially incorporates the first fiber prepreg layer. The wedge-shaped element is positioned at the run-out of the first doubler and the fiber prepreg layer is positioned underneath the perimeter region of the first doubler. The aircraft structure part prevents cracks occurring in the wedge-shaped element from propagating in the basic skin due to the fiber prepreg incorporated therein. The aircraft structure part has the advantage of providing a smooth transition of load carrying sheet metal layers inside a stepped longitudinal joint. Basic layer and first doubler are manufactured from a metal material, preferably of aluminum.

A further aspect of the disclosure herein lies in a method for providing an aircraft structure part, comprising depositing an intermediate bond film layer on a surface facing the inner skin of the aircraft fuselage, depositing a first fiber prepreg layer, in particular a glass fiber prepreg layer, adjacent to the first intermediate bond film layer, depositing a first doubler on the first intermediate bond film layer and the fiber prepreg layer, depositing at least a first bond film segment adjacent to the first fiber prepreg layer, and autoclaving the aircraft structure part to form a first wedge-shaped element in a run-out region of the first doubler incorporating the area of the first fiber prepreg layer extending beyond the perimeter of the first doubler. The method avoids manufacturing of airport structure parts in a time and material intensive milling process, improves the load carrying properties and reduces or eliminates crack initiation and propagation into the inner skin or basic layer.

A further aspect of the disclosure herein lies in an aircraft fuselage provided with an aircraft structure part, wherein the aircraft structure part is a load carrying part of the aircraft fuselage showing no or only reduced crack initiation and limited crack propagation.

Advantageous embodiments and further developments are apparent from the description with reference to the figures.

According to another aspect of the disclosure herein the aircraft structure part according further comprises at least one second doubler with a second fiber prepreg layer positioned at the perimeter of the second doubler, wherein the second doubler is bonded to the first doubler by a second intermediate bond film layer, forming a step-shaped configuration of the aircraft structure part. The second fiber prepreg layer is bonded to the first doubler by at least one second bond film segment deposited adjacent to the second fiber prepreg layer in a second wedge-shaped element, at least partially incorporating the second fiber prepreg layer. This provides an advantage, that the overall thickness of the aircraft structure part can be increased having the same advantages as described above with respect to crack formation and propagation. The disclosure herein is not limited to aircraft structure parts having two doublers in an arrangement as described before but also encompasses configurations comprising a plurality of doublers in stacked arrangement with step-shaped design and provided on a basic skin or basic layer of an aircraft fuselage. The second and any subsequent doubler are manufactured from a metal material such as aluminum. The second and any subsequent doubler can be provided with at least one step introduced by respective machining in particular by grinding or milling the aluminum to further reduce thickness by stepping down the doubler.

According to another embodiment of the aircraft structure part, the at least first and second wedge-shaped elements are positioned in a run-out region of the first and second doubler, respectively. This configuration further supports a smooth transition of load carrying sheet metal layers inside a stepped longitudinal joint. Furthermore cracks formed in the wedge-shaped elements cannot propagate into metal layers due to the fiber-prepreg layers positioned underneath the wedge-shaped elements.

According to a further embodiment of the aircraft structure part the fibers of the fiber prepreg layers are oriented in a circumferential direction of the doublers. Beside the previously outlined advantages of the disclosure herein configuration, this has the advantage, that cracks formed in particular in the area of the one or more wedge-shaped elements, are deflected at an angle of essentially 90 degrees and, in particular, cannot propagate or spread into the metal layers of the aircraft structure part, the basic layer or basic skin, the doubler or into the fuselage.

According to a further embodiment of the aircraft structure part each of the first and second fiber prepreg layer is arranged coplanar to a surface plane of the respective first doubler and the second doubler and projects beyond the surface plane of the respective doubler. This embodiment has the advantage, that cracks if formed in the bond film layer or the wedge shaped elements cannot propagate or spread into the metal layers of the aircraft structure part, the basic layer or skin or in the fuselage and hence impact the load carrying properties of the structure.

According to a further embodiment of the aircraft structure part at least the wedge-shaped elements are formed in an autoclaving process. It is an advantage of this embodiment, that during autoclaving the bond film layers placed adjacent to or on the fiber prepreg layer are incorporated in the wedge-shaped elements thus achieving and/or improving the previously described advantages with respect to crack formation and propagation within the aircraft structure part or fuselage provided therewith.

According to a further embodiment of the method a second bond film segment is deposited covering the area of the first fiber prepreg layer extending beyond the perimeter of a surface of the first doubler and the second bond film segment. This allows for an advantageously improved incorporation of the fiber prepreg layer into the wedge-shaped element during autoclaving.

According to a further embodiment of the method, a second intermediate bond film layer and a second fiber prepreg layer arranged adjacent to the second intermediate bond film layer are deposited on the first doubler and at least one second doubler is deposited on the second intermediate bond film layer and the second fiber prepreg layer wherein the second fiber prepreg layer extends beyond the perimeter of a surface of the second doubler, and a third bond film segment is deposited adjacent to the second fiber prepreg layer. After deposition the aircraft structure part is autoclaved to form a second wedge shaped element in a run-out region of the second doubler incorporating the area of the second fiber prepreg layer that extends beyond the perimeter of the surface of the second doubler. This has the advantage, that the overall number of doublers arranged in a stacked configuration can be increased and adapted to the area of placement of the aircraft structure part and the requirements with respect to load carrying. The method is not limited to methods placing two doublers in an arrangement as described above but also contemplates configurations comprising a plurality of doublers in stacked arrangement and manufactured in the method.

According to a further embodiment the method a fourth bond film segment is deposited covering the area of the second fiber prepreg layer extending beyond the perimeter of the second doubler and the fourth bond film segment. It is an advantage of this embodiment, that during autoclaving the bond film layers placed adjacent to or on the fiber prepreg layer are incorporated in the wedge-shaped elements at the run-out region of the second doubler thus achieving and/or improving the previously described advantages with respect to crack formation and propagation within the aircraft structure part or a fuselage provided therewith. The method is not limited to methods placing two doublers in an arrangement as described above but also encompasses configurations comprising a plurality of doublers in stacked arrangement and manufactured in the method.

According to a further embodiment the method before autoclaving at least one separation foil and a forming sheet is deposited on the run-out region of at least one of the first doubler and the second doubler to form at least one of the first and the second wedge-shaped element during autoclaving. This has the advantage that during autoclaving the final shape of the wedge-shaped elements can be determined and adapted to the requirements set out by the envisaged configuration of the aircraft structure part and its region of placement.

According to a further embodiment the method the aircraft structure part is placed on the inner skin of an aircraft fuselage and fastened to the inner skin by a plurality of fastener elements, wherein the fastener elements extend through the basic skin and the inner skin and clamp the aircraft structure part with the inner skin thereby bending the basic skin and the at least one doubler at least partially towards the inner skin. This has the advantage, that due to the configuration of the aircraft structure part with added layers of fiber prepregs underneath the end region of the doublers crack initiation in the bond film layer and crack propagation into the metal layers is prevented. The layers of fiber prepregs also prevent a crack if appearing in the wedge-shaped element or the bond film layer from growing and/or from propagating towards the basic layer of the aircraft structure part or the fuselage basic skin.

According to a further embodiment the method a gap formed between the aircraft structure part and the inner skin is filled with a sealant, in particular an interference sealant.

BRIEF DESCRIPTION OF THE DRAWINGS

The disclosure herein is explained in more detail below with reference to the embodiments shown in the schematic figures:

FIG. 1 schematically depicts a view of a prior art aircraft structure part;

FIG. 2 schematically depicts a side sectional view of an aircraft structure part according to an embodiment of the disclosure herein in the pre-autoclaving state;

DETAILED DESCRIPTION

Figure 3:
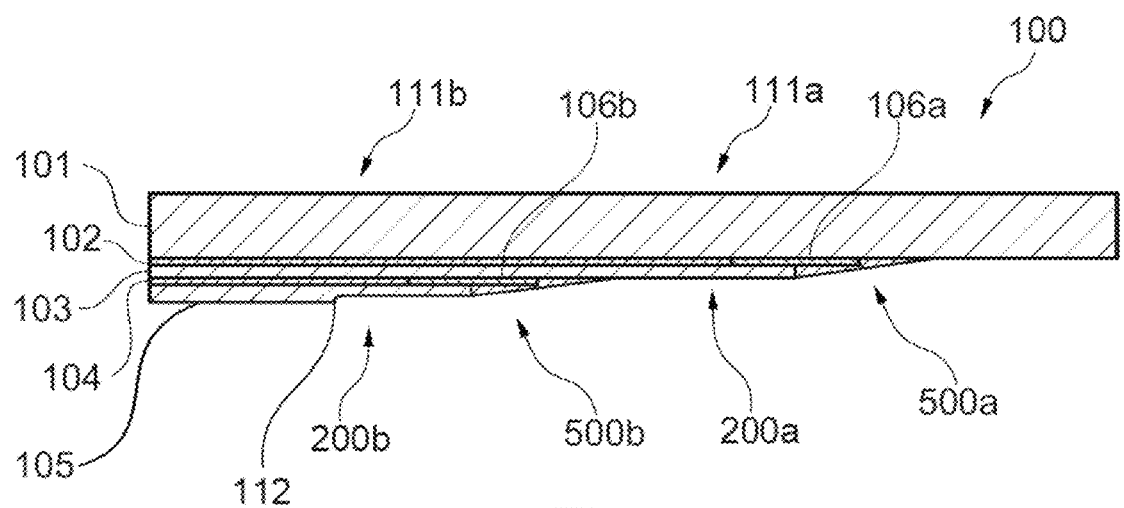
FIG. 3 schematically depicts a side sectional view of an aircraft structure part according to an embodiment of the disclosure herein in the post-autoclaving state.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

In the figures of the drawings, identical elements, features, and components that have the same function, and the same effect are each given the same reference signs, unless otherwise specified.

FIG. 1 depicts a view of a prior art aircraft structure part 100 schematically showing a milled single part. In such a milled part design either a milled ramp or small steps 112 are used to create a reduction in thickness, wherein the small steps 112 are reflecting the current standard in manufacturing the aircraft structure part 100 having drawbacks with respect to crack formation and propagation.

FIG. 2 schematically depicts a side sectional view of an aircraft structure part 100 according to an embodiment of the disclosure herein in the pre-autoclaving state. The aircraft structure part 100 consists of a total of three metal, in particular aluminum based layers, a basic skin layer 101, a first doubler 103 and a second doubler 105 arranged in a stacked configuration. The basic layer 101 can be the outer skin of an aircraft fuselage. To bond the first doubler 103 to the basic layer 101 a first intermediate bond film layer 102 arranged between the two elements is used. The first doubler 103 comprises a first fiber prepreg layer 106a, in particular glass fiber prepreg layer, arranged at the perimeter 111a of the first doubler 103 underneath the first doubler 103. The first fiber prepreg layer 106a is bonded to the basic layer 101 by a first bond-film segment 107 deposited adjacent to the first fiber prepreg layer 106a and covered by a second bond-film segment 108. On the first doubler 103 a second doubler 105 is placed, bonded to the first doubler 103 by a second intermediate bond film layer 104. The second doubler 105 is shorter than the first doubler 103 thus forming a step-shaped configuration of the aircraft structure part 100. A second fiber prepreg layer 106b is arranged at the perimeter 111b of the second doubler 105 underneath the second doubler 105 and bonded to the first doubler 103 by a third bond film segment 109 deposited adjacent to the second fiber prepreg layer 106b and covered by a fourth bond-film segment 110. During manufacturing the second doubler 105 a small step 112 was inserted by milling the second doubler 105 in order to create a further reduction in thickness. The second doubler 105 can also be provided with more than one step 112 to further step down the second doubler 105.

Before autoclaving a separation foil 401a and forming sheet 400a is deposited on the arrangement placed in the run-out region 200a of the first doubler 103 and a further separation foil 401b and forming sheet 400b is deposited on the arrangement placed in the run-out region 200b of the second doubler 105. During autoclaving the forming sheets 400a, b form a first wedge-shaped element 500a in the run-out region 200a of the first doubler 103 and a second wedge-shaped element 500b in the run-out region 200b of the second doubler 105. The wedge-shaped elements 500a, b at least partially incorporate the fiber prepreg layers 106a, b and extend each run-out regions 200a, b of the first doubler 103 and the second doubler 105 towards the respective previous layer.

FIG. 3 schematically depicts a side sectional view of an aircraft structure part 100 according to an embodiment of the disclosure herein in the post-autoclaving state. In the run-out regions 200a, b the wedge-shaped elements 500a, b are formed and the metal layers comprising basic layer 100, first doubler 103 and second doubler 105 are bonded to each other. A step-shaped configuration of the aircraft structure part 100 has been generated without the need for milling the parts to a major extend. The thickness of the second doubler 105 is further reduced by providing at least one step 112 in the surface of this element. The layers of fiber material generated from the fiber prepreg layers 106a, b placed underneath the first doubler 103 and the second doubler 105, respectively prevent cracks formed in the wedge-shaped elements 500a, b formed adjacent to the first doubler 103 and the second doubler 105 from propagating in the metal layers and to grow towards the basic layer 101 and hence the metallic outer skin.

Figure 4:
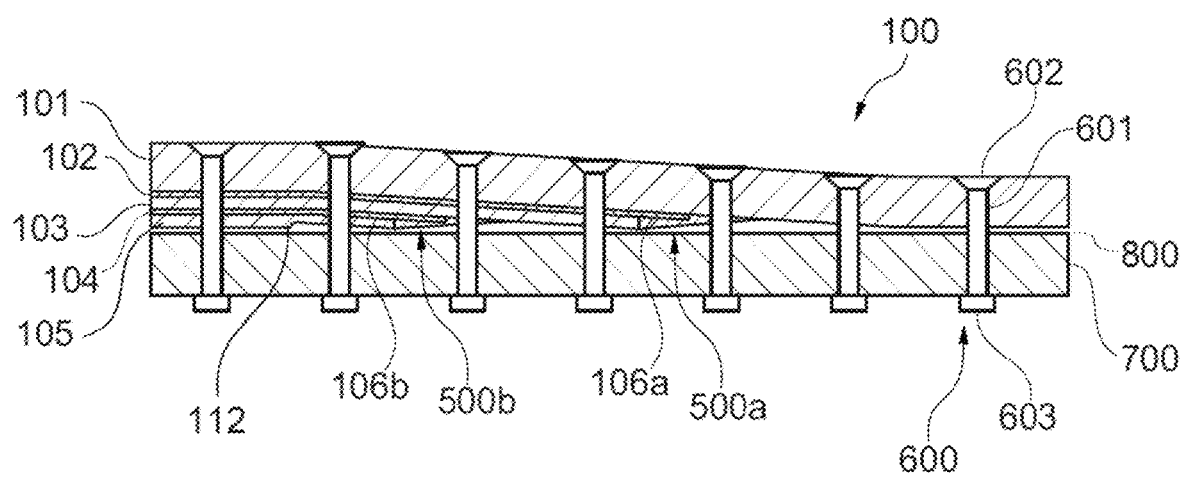
FIG. 4 schematically depicts a side sectional view of an aircraft structure part according to an embodiment of the disclosure herein clamped to the inner skin of an aircraft fuselage.

FIG. 4 schematically depicts a side sectional view of an aircraft structure part 100 according to an embodiment of the disclosure herein clamped to the inner skin 700 of an aircraft fuselage. The aircraft structure part 100 as described in connection with FIG. 3 is placed on the inner skin 700 of an aircraft fuselage and fastened to the inner skin 700 by a plurality of fastener elements 600, wherein the fastener elements 600 extend through the basic layer 101 forming the outer skin of the aircraft fuselage and the inner skin 700. FIG. 4 depicts a configuration wherein the basic skin 101 and the inner skin 700 are connected by rivets acting as fastener elements 600, with a first, upper rivet head 602 being countersunk flush into the basic layer 101 and the second, lower rivet head 603 resting on the inner skin 700 with the rivet shaft 601 connection first rivet head 602 and second rivet head 603. The fastener elements 600 clamp the aircraft structure part 100 with the inner skin 700 thereby bending the layers of the aircraft structure part 100 of the disclosure herein at least partially towards the inner skin 700. The stacked configuration prevents crack formation in the metal layers during bending and the fiber prepreg layers 106a, b prevent propagation of cracks formed in the wedge-shaped elements 500a, b formed adjacent to the first doubler 103 and the second doubler 105 into the metal layers. Thus a smooth transition of load carrying metal layers in a longitudinal direction of a stepped joint is reached and crack propagation beyond the wedge-shaped elements 500a, b is prevented. The thickness of the second doubler 105 is further reduced by providing at least one step 112 in the surface of this element. The gap 800 remaining between the aircraft structure part 100 and the inner skin 700 after connection is filled with a sealant (not shown), preferably an interference sealant.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 100 aircraft structure part
101 basic layer
102 first intermediate bond film layer
103 first doubler 104 second intermediate bond film layer
105 second doubler
106a, b fiber prepreg layer
107 first bond-film segment
108 second bond-film segment
109 third bond film segment
110 fourth bond-film segment
111a, b perimeter
112 step
200a,b run-out region
400a, b forming sheet
401a, b separation foil
500a, b wedge-shaped element
600 fastener element
601 rivet shaft
602 first rivet head
603 second rivet head
700 inner skin
800 gap

The invention claimed is:

1. An aircraft structure part having a stacked arrangement of layers with the layers being one of an at least first doubler and a basic layer of an outer skin of an aircraft fuselage, with the first doubler and the basic layer being bonded by a first intermediate bond film layer to form a step-shaped configuration of the aircraft structure part, wherein the first doubler comprises a glass first fiber prepreg layer at a perimeter of the first doubler and wherein the first fiber prepreg layer is bonded to the basic layer by at least one first bond-film segment deposited adjacent to the first fiber prepreg layer in a first wedge-shaped element at least partially incorporating the first fiber prepreg layer.

2. The aircraft structure part according to claim 1, comprising at least one second doubler with a second fiber prepreg layer at a perimeter of the second doubler wherein the second doubler is bonded to the first doubler by a second intermediate bond film layer to form a step-shaped configuration of the aircraft structure part and wherein the second fiber prepreg layer is bonded to the first doubler by at least one second bond film segment deposited adjacent to the second fiber prepreg layer in a second wedge-shaped element at least partially incorporating the second fiber prepreg layer.

3. The aircraft structure part according to claim 1, wherein the at least first and second wedge-shaped elements are positioned in a run-out region of the first doubler and the second doubler, respectively.

4. The aircraft structure part according to claim 1, wherein fibers of the fiber prepreg layers are oriented in a circumferential direction of the first doubler and second doubler.

5. The aircraft structure part according to claim 1, wherein each of the first and second fiber prepreg layer is arranged coplanar to a surface plane of the respective first doubler and the second doubler and projecting beyond the surface plane of the respective doubler.

6. The aircraft structure part according to claim 1, wherein at least the wedge-shaped elements are formed in an autoclaving process.

7. A method for providing the aircraft structure part according to claim 1, the method comprising depositing on a surface of the basic layer of the aircraft structure part facing an inner skin of an aircraft fuselage a first intermediate bond film layer, depositing a first glass fiber prepreg layer adjacent to first intermediate bond film layer, depositing a first doubler on the first intermediate bond film layer and the fiber prepreg layer such that an area of the first fiber prepreg layer extends beyond the perimeter of the first doubler, depositing at least a first bond film segment adjacent to the first fiber prepreg layer and autoclaving the aircraft structure part to form a first wedge shaped element in a run-out region of the first doubler incorporating the area of the first fiber prepreg layer extending beyond the perimeter of the first doubler.

8. The method according to claim 7, wherein a second bond film segment is deposited covering the area of the first fiber prepreg layer extending beyond the perimeter of the first doubler and the first bond film segment.

9. The method according to claim 7, wherein a second intermediate bond film layer and a second fiber prepreg layer adjacent to the second intermediate bond film layer is deposited on the first doubler and at least one second doubler is deposited on the second intermediate bond film layer and the second fiber prepreg layer with the second fiber prepreg layer extending beyond a perimeter of the second doubler, depositing a third bond film segment adjacent to the second fiber prepreg layer and autoclaving the aircraft structure part to form a second wedge shaped element in a run-out region of the second doubler incorporating the area of the second fiber prepreg layer extending beyond the perimeter of the second doubler.

10. The method according to claim 7, wherein a fourth bond film segment is deposited covering the area of the second fiber prepreg layer extending beyond the perimeter of the second doubler and the third bond film segment.

11. The method according to claim 7, wherein at least one further doubler is deposited on a second doubler in a method:
wherein a second intermediate bond film layer and a second fiber prepreg layer adjacent to the second intermediate bond film layer is deposited on the first doubler and at least one second doubler is deposited on the second intermediate bond film layer and the second fiber prepreg layer with the second fiber prepreg layer extending beyond a perimeter of the second doubler, depositing a third bond film segment adjacent to the second fiber prepreg layer and autoclaving the aircraft structure part to form a second wedge shaped element in a run-out region of the second doubler incorporating the area of the second fiber prepreg layer extending beyond the perimeter of the second doubler;
or in a method wherein a fourth bond film segment is deposited covering the area of the second fiber prepreg layer extending beyond a perimeter of the second doubler and the third bond film segment.

12. The method according to claim 7, wherein before autoclaving at least one separation foil and a forming sheet is deposited on the run-out region of at least one of the first doubler and the second doubler to form at least one of the first and the second wedge-shaped element during autoclaving.

13. The method according to claim 7, wherein the aircraft structure part is placed on the inner skin of an aircraft fuselage and fastened to the inner skin by a plurality of fastener elements, wherein the fastener elements extend through the basic layer and the inner skin and clamp the aircraft structure part with the inner skin thereby bending the basic layer and the at least one doubler at least partially towards the inner skin.

14. The method according to claim 7, wherein a gap formed between the aircraft structure part and the inner skin is filled with a sealant or an interference sealant.

15. An aircraft fuselage comprising the aircraft structure part according to claim 1, wherein the aircraft structure part is a load carrying part of the aircraft fuselage.

* * * * *